United States Patent
Joo et al.

(10) Patent No.: US 6,888,671 B2
(45) Date of Patent: May 3, 2005

(54) OPTICAL AMPLIFIER DEVICE AND BIDIRECTIONAL WAVELENGTH DIVISION MULTIPLEXING OPTICAL COMMUNICATION SYSTEM USING THE SAME

(75) Inventors: Young-Hoon Joo, Yongin-shi (KR); Seong-Taek Hwang, Pyungtaek-shi (KR); Seong-Ha Kim, Suwon-shi (KR); Gyu-Woong Lee, Yongin-shi (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 10/047,707

(22) Filed: Jan. 15, 2002

(65) Prior Publication Data

US 2002/0141046 A1 Oct. 3, 2002

(30) Foreign Application Priority Data

Apr. 2, 2001 (KR) ....................... 2001-17396

(51) Int. Cl.⁷ ............................... H01S 3/00
(52) U.S. Cl. .................................... 359/341.2
(58) Field of Search ....................... 359/341.2

(56) References Cited

U.S. PATENT DOCUMENTS 5,452,124 A * 9/1995 Baker ...................... 359/341.2
5,563,733 A * 10/1996 Mitsuda et al. ........... 359/337.1

(Continued)

FOREIGN PATENT DOCUMENTS

| JP | 06342952 A | * 12/1994 | ............ H01S/3/10 |
|----|------------|-----------|----------------------|
| JP | 08-265272  | 10/1996   | ............ H04B/10/24 |
| JP | 08-265299  | 10/1996   | ............ H04J/14/00 |
| JP | 10-322286  | 12/1998   | ............ H04B/10/17 |
| JP | 11-112427  | 4/1999    | ............ H04B/10/02 |
| JP | 2000-224108 | 8/2000   | ............ H04B/10/02 |
| JP | 2000-231063 | 8/2000   | ............ G02B/26/00 |
| JP | 2000-244402 | 9/2000   | ............ H04B/10/02 |

OTHER PUBLICATIONS

Radic et al. OFC '2001, Mar. 17–22, 2001, pp. ThF7–T1–3. vol. 4.*

(Continued)

Primary Examiner—Mark Hellner
Assistant Examiner—Deandra M. Hughes
(74) Attorney, Agent, or Firm—Cha & Reiter L.L.C.

(57) ABSTRACT

Disclosed is a bi-direcional wavelength-division multiplexing optical communication system including a first optical transmitter/receiver unit for transmitting a forward optical signal composed of a plurality of channels respectively allocated with wavelengths having a desired wavelength space while receiving a reverse optical signal composed of a plurality of channels respectively allocated with wavelengths each interleaved between associated ones of the wavelengths of the forward optical signal, a second optical transmitter/receiver unit for transmitting the reverse optical signal while receiving the forward optical signal, an optical fiber coupled between the first and second optical transmitter/receiver units, the optical fiber serving as a transmission medium for the forward and reverse optical signals, and an optical amplifier device arranged on the optical fiber and adapted to interleave the channels of the forward and reverse optical signals, bi-directionally received via the optical fiber, in accordance with the wavelengths of the channels, to amplify an interleaved optical signal generated in accordance with the interleaving operation, to split the amplified optical signal into the forward and reverse optical signals in accordance with wavelengths, and to bi-directionally transmit the split forward and reverse optical signals via the optical fiber.

7 Claims, 6 Drawing Sheets

U.S. PATENT DOCUMENTS

| | | | | |
|---|---|---|---|---|
| 5,604,627 | A | * | 2/1997 | Kohn ....................... 359/341.2 |
| 5,633,741 | A | * | 5/1997 | Giles ......................... 359/124 |
| 5,740,289 | A | | 4/1998 | Glance ........................ 385/24 |
| 5,748,363 | A | * | 5/1998 | Duck et al. .............. 359/341.1 |
| 5,801,858 | A | | 9/1998 | Roberts et al. ............ 359/114 |
| 5,812,306 | A | * | 9/1998 | Mizrahi ................... 359/341.2 |
| 5,926,590 | A | | 7/1999 | Mao ............................. 385/24 |
| 5,995,259 | A | * | 11/1999 | Meli et al. .................. 359/134 |
| 6,157,475 | A | * | 12/2000 | Dugan et al. ............... 359/110 |
| 6,236,499 | B1 | * | 5/2001 | Berg et al. ............... 359/341.2 |
| 6,388,805 | B1 | * | 5/2002 | Spock et al. ............. 359/341.2 |
| 2001/0048545 | A1 | * | 12/2001 | Shimojoh ................ 359/341.1 |

OTHER PUBLICATIONS

Park et al. IEEE Phot. Tech. Letts. vol. 12, No. 2. Feb 2000.*

Farre et al. IEEE Phot. Tech. Letts, vol. 4, No. 4, Apr. 1993.*

Kim et al. OFC/IOOC '99, Feb. 21–26, 1999. vol. 2, pp. 310–312.*

* cited by examiner

OPTICAL AMPLIFIER DEVICE AND BIDIRECTIONAL WAVELENGTH DIVISION MULTIPLEXING OPTICAL COMMUNICATION SYSTEM USING THE SAME

This application makes reference to and claims all benefits accruing under 35 U.S.C. Section 119 from an application entitled, "OPTICAL AMPLIFIER DEVICE AND BIDIRECTIONAL WAVELENGTH DIVISION MULTIPLEXING OPTICAL COMMUNICATION SYSTEM USING THE SAME," filed with the Korean Industrial Property Office on Apr. 2, 2001 and there duly assigned Ser. No. 2001-17396.

BACKGROUND OF THE INVENTION

1. Field of the Invention

The present invention relates to bi-directional wavelength-division-multiplexing (WDM) optical communications and, more particularly, to an optical amplifier device used in the bi-directional WDM optical system.

2. Description of the Related Art

A WDM optical communication system is adapted to transmit a plurality of channels through an optical fiber. As such, this type of system is widely used in the ultra-high-speed Internet as it has superior characteristics in terms of transmission efficiency and transmission capacity. As optical signals transmitted along the optical fiber tend to attenuate in proportion to the transmission length thereof, an optical amplifier is installed along the optical fiber for amplification of the attenuated channels.

FIG. 1 is a circuit diagram illustrating a conventional bi-directional WDM optical communication system. As shown in FIG. 1, the system includes a first optical transmitter/receiver unit 100, an optical amplifier unit 200, a second optical transmitter/receiver unit 300, and an optical fiber 400. The optical signal transmitted from the first optical transmitter/receiver unit 100 to the second optical transmitter/receiver unit 300 is referred to as a forward optical signal 115, whereas the optical signal reversely transmitted is referred to as a reverse optical signal 315. Each of the forward and reverse optical signals 115 and 315 is composed of a plurality of channels with different wavelengths.

The first optical transmitter/receiver unit 100 includes a plurality of first transmitters 110, a plurality of first receivers 180, a first wavelength-division multiplexer 120, a first wavelength-division demultiplexer 170, a first dispersion-compensation fiber 130, a first amplifier 140, a second amplifier 160, and a first optical circulator 150. In usage, the first transmitters 110 output channels of different wavelengths, respectively. The first wavelength-division multiplexer 120 receives the channels from the first transmitters 110, and multiplexes the received channels, thereby outputting a channel-multiplexed signal, that is, the forward optical signal 115. The first dispersion-compensation fiber 130 compensates the dispersion in the forward optical signal 115. The dispersion of the forward optical signal 115 is caused by the fact that the channels of the forward optical signal 115 have different wavelengths, respectively. The first amplifier 140 amplifies the forward optical signal 115 by utilizing an induced emission of erbium ions and a laser diode for emitting pumping light adapted to excite the erbium ions, and a wavelength-selection coupler for applying the pumping light to the erbium-doped optical fiber. Thereafter, the first circulator 150 transmits the forward optical signal 115 received from the first amplifier 140 to the optical amplifier unit 200 via the optical fiber 400, while sending the reverse optical signal 315 from the optical amplifier unit 200 to the second amplifier 160.

The second amplifier 160 amplifies the reverse optical signal 315 inputted thereto and applies the amplified reverse optical signal 315 to the first wavelength-division demultiplexer 170. Then, the first wavelength-division demultiplexer 170 demultiplexes the reverse optical signal 315 into a plurality of channels with different wavelengths. The first receivers 180 receive the channels outputted from the first wavelength-division demultiplexer 170. Meanwhile, the optical fiber 400 couples the first and second optical transmitter/receiver units 100 and 300 to each other, and serves as a transmission medium for the forward and reverse optical signals 115 and 315.

Next, the optical amplifier unit 200 includes a second circulator 210, a third circulator 240, a second dispersion compensation fiber 220, a third dispersion compensation fiber 250, a third amplifier 230, and a fourth amplifier 260. In operation, the second circulator 210 transmits the forward optical signal 115, received from the first optical transmitter/receiver unit 100 via the optical fiber 400, to the second dispersion compensation optical fiber 220, while sending the reverse optical signal 315 from the fourth amplifier 260 to the first optical transmitter/receiver 100 via the optical fiber 400. The second dispersion compensation optical fiber 220 compensates the dispersion of the forward optical signal 115 and applies the dispersion-compensated forward optical signal 115 to the third amplifier 230. The forward optical signal 115 is amplified by the third amplifier 230, and then applied to the third circulator 240. The third circulator 240 transmits the forward optical signal 115, inputted thereto, to the second optical transmitter/receiver unit 300 via the optical fiber 400, while sending the reverse optical signal 315, inputted thereto via the optical fiber 400, to the third dispersion-compensation optical fiber 250. The third dispersion-compensation optical fiber 250 compensates for a dispersion of the reverse optical signal 315. The fourth amplifier 260 amplifies the dispersion-compensated reverse optical signal 315, and then transmits the amplified reverse optical signal 315 to the second circulator 210.

The second optical transmitter/receiver unit 300 includes a plurality of second transmitters 310, a plurality of second receivers 380, a second wavelength-division multiplexer 320, a second wavelength-division demultiplexer 370, a fourth dispersion-compensation fiber 330, a fifth amplifier 340, a sixth amplifier 360, and a fourth circulator 350. In use, the second transmitters 310 output channels of different wavelengths, respectively. The second wavelength-division multiplexer 320 receives the channels from the second transmitters 310 and multiplexes the received channels, thereby outputting a channel-multiplexed signal, that is, the reverse optical signal 315. The second dispersion-compensation fiber 330 compensates the dispersion of the reverse optical signal 315. The fifth amplifier 340 amplifies the reverse optical signal 315. The fourth circulator 350 transmits the reverse optical signal 315 received from the fifth amplifier 340 to the optical-amplifier unit 200 via the optical fiber 400, while sending the forward optical signal 115, received from the optical-amplifier unit 200 via the optical fiber 400, to the sixth amplifier 360. The sixth amplifier 360 amplifies the forward optical signal 115 inputted thereto, and applies the amplified forward optical signal 115 to the second wavelength-division demultiplexer 370. The second wavelength-division demultiplexer 370 demultiplexes the forward optical signal 115 into a plurality of channels with different wavelengths. The second receivers 380 receive the channels outputted from the second wavelength-division demultiplexer 370, respectively.

FIG. 2 is a graph depicting the forward and reverse optical signals 115 and 315. As shown in FIG. 2, the bi-direcional WDM optical communication system of FIG. 1 uses a wavelength band ranging from 1,532 nm to 1,554 nm. Readers can note that the wavelength space between adjacent channels in the forward (or reverse optical signal) 115 (or 315) is 2 nm. The wavelength band of the forward optical signal 115 ranges from 1,532 nm to 1,542 nm, whereas the wavelength band of the reverse optical signal 315 ranges from 1,544 nm to 1,554 nm. That is, the forward optical signal 115 is distributed within a relatively short-wavelength band, whereas the reverse optical signal 315 is distributed within a relatively long-wavelength band. Such an multi-channel optical signal is subjected to signal distortion due to a cross phase modulation (XPM) phenomenon caused by a signal-power difference between adjacent channels, a four-wave mixing (FWM) phenomenon, i.e., the introduction of noise from a channel into adjacent channels, the dispersion phenomenon, and the scattering phenomenon. Where an optical signal is severely distorted, it cannot be received by the receiver unit. For this reason, the wavelength space of adjacent channels is set, taking into consideration such a signal distortion of optical signals. This wavelength space is referred to as a "minimum wavelength space." The available wavelength band of an optical signal is limited due to an attenuation of the optical signal caused by loss characteristics of the optical fiber through which the optical signal passes. The available wavelength band is referred to as a "maximum wavelength band." As a result, the maximum wavelength band in the bi-directional WDM optical communication system shown in FIG. 1 is 1,532 nm to 1,554 nm. Accordingly, the maximum number of channels in an optical signal transmittable at a minimum wavelength space of 2 nm is 12.

FIG. 3 is a circuit diagram illustrating the optical amplifier unit 200 shown in FIG. 1. As shown in FIG. 3, the optical amplifier unit 200, which includes the second circulator 210, third circulator 240, second dispersion compensation fiber 220, third dispersion compensation fiber 250, third amplifier 230, and fourth amplifier 260, further includes a first isolator 232, a second isolator 262, a first erbium-doped optical fiber 234, a second erbium-doped optical fiber 264, a first wavelength-selecting coupler 238, a second wavelength-selecting coupler 268, a first laser diode 236, and a second laser diode 266. The third and fourth amplifiers 230 and 260 have the same configurations as those of the first and second amplifiers 140 and 160 or those of the fifth and sixth amplifiers 340 and 360, respectively. For simplicity, the duplicated configurations of the amplifiers will be omitted herein.

The first isolator 232 transmits the forward optical signal 115, received from the second dispersion-compensation fiber 220, therethrough while preventing optical signals, traveling in a reverse direction of the forward optical signal 115, from passing therethrough. For this reason, the pumping light 237 traveling along the first erbium-doped optical fiber 234 after being outputted from the first laser diode 236 cannot pass through the first isolator 232. Thereafter, the first erbium-doped optical fiber 234 amplifies the forward optical signal 115 by utilizing an induced emission of excited erbium ions. At the same time, the pumping light 237 is emitted from the first laser diode 236 for exciting erbium ions. The first wavelength-selecting coupler 238 transmits the amplified-forward optical signal 115 therethrough, so that the amplified-forward optical signal 115 is applied to the third circulator 240. The first wavelength-selecting coupler 238 also sends the pumping light 237, received from the first laser diode 236, to the first erbium-doped optical fiber 234.

Similarly, the second isolator 262 transmits the reverse optical signal 315, received from the third dispersion-compensation fiber 250, therethrough while preventing optical signals, traveling in a reverse direction from the reverse optical signal 315, from passing therethrough. For this reason, the pumping light 267 traveling along the second erbium-doped optical fiber 264 after being outputted from the second laser diode 266 cannot pass through the second isolator 232. The second erbium-doped optical fiber 264 amplifies the reverse optical signal 315. The pumping light 267 is emitted from the second laser diode 266. The second wavelength-selecting coupler 268 transmits the amplified reverse optical signal 315 therethrough, so that the amplified reverse optical signal 315 is applied to the second circulator 210. The second wavelength-selecting coupler 268 also sends the pumping light 267, received from the second laser diode 266, to the second erbium-doped optical fiber 264.

Although not shown, it is necessary to additionally provide a laser diode driving unit at each of the optical fiber amplifiers 230 and 260 in order to supply a drive current to an associated one of the laser diodes 236 and 266. It may be also necessary to additionally provide a gain-flattening filter in order to compensate for the gain unbalance caused by non-uniformity in the amplification rate of each erbium-doped optical fiber 234 or 264 resulting from a variation in the wavelength of the input optical signal.

As mentioned above, the conventional optical amplifier device has respective configurations adapted to amplify forward and reverse optical signals. For this reason, the conventional optical amplifier device has drawbacks in that it requires duplicated elements, i.e., optical amplifiers. In addition, it is necessary to use multiple-dispersion-compensation fibers and other optical elements. For this reason, the conventional optical amplifier device increases manufacturing costs and maintenance costs. Furthermore, the conventional bi-directional WDM communication system is configured to divide their available wavelength band into long and short-wavelength bands to be respectively allocated to forward and reverse optical signals. For this reason, there is a problem in that the channel density in the maximum wavelength band is reduced.

SUMMARY OF THE INVENTION

The present invention overcomes the above-described problems, and provides additional advantages by providing an optical-amplifier device, which can be inexpensively manufactured while having a high-integration degree.

Another aspect of the invention is to provide a bi-directional WDN optical communication system capable of obtaining an increased channel density in a maximum wavelength band.

Yet, another aspect of the invention is to provide a bi-directional WDM optical communication system of the type having first and second optical transmitter/receiver units for transmitting and receiving wavelength-division-multiplexed optical signals, respectively; an optical fiber serving as a transmission medium for a forward optical signal traveling from the first optical transmitter/receiver unit to the second optical transmitter/receiver unit and a reverse optical signal traveling from the second optical transmitter/receiver unit to the first optical transmitter/receiver unit, each of the forward and reverse optical signals being composed of a plurality of channels with different wavelengths; and, an optical amplifier device for amplifying the forward and reverse optical signals. The system includes a first interleaver for interleaving the channels of the forward optical signal received at a first terminal thereof and the channels of the reverse optical signal received at a second terminal thereof, in accordance with the wavelengths of the channels, and outputting an interleaved optical signal at a third terminal thereof; an optical fiber amplifier unit for amplifying the interleaved optical signal received from the third terminal of the first interleaver, and outputting the amplified optical signal; and, a second interleaver for splitting the amplified optical signal, received at a third terminal thereof, into the forward and reverse optical signals in accordance with wavelengths, and outputting the forward and reverse optical signals at first and second terminals thereof, respectively.

A further aspect of the invention is to provide a bi-directional wavelength-division-multiplexing optical communication system, which includes a first optical transmitter/receiver unit for transmitting a forward optical signal comprised of a plurality of channels respectively allocated with wavelengths having a desired wavelength space, while receiving a reverse optical signal composed of a plurality of channels respectively allocated with wavelengths each interleaved between associated ones of the wavelengths of the forward optical signal; a second optical transmitter/receiver unit for transmitting the reverse optical signal while receiving the forward optical signal; an optical fiber coupled between the first and second optical transmitter/receiver units, the optical fiber serving as a transmission medium for the forward and reverse optical signals; and, an optical amplifier device arranged on the optical fiber and adapted to interleave the channels of the forward and reverse optical signals, bi-directionally received via the optical fiber, in accordance with the wavelengths of the channels, to amplify an interleaved optical signal generated in accordance with the interleaving operation, to split the amplified optical signal into the forward and reverse optical signals in accordance with wavelengths, and to bi-directionally transmit the split-forward and reverse optical signals via the optical fiber.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 4:
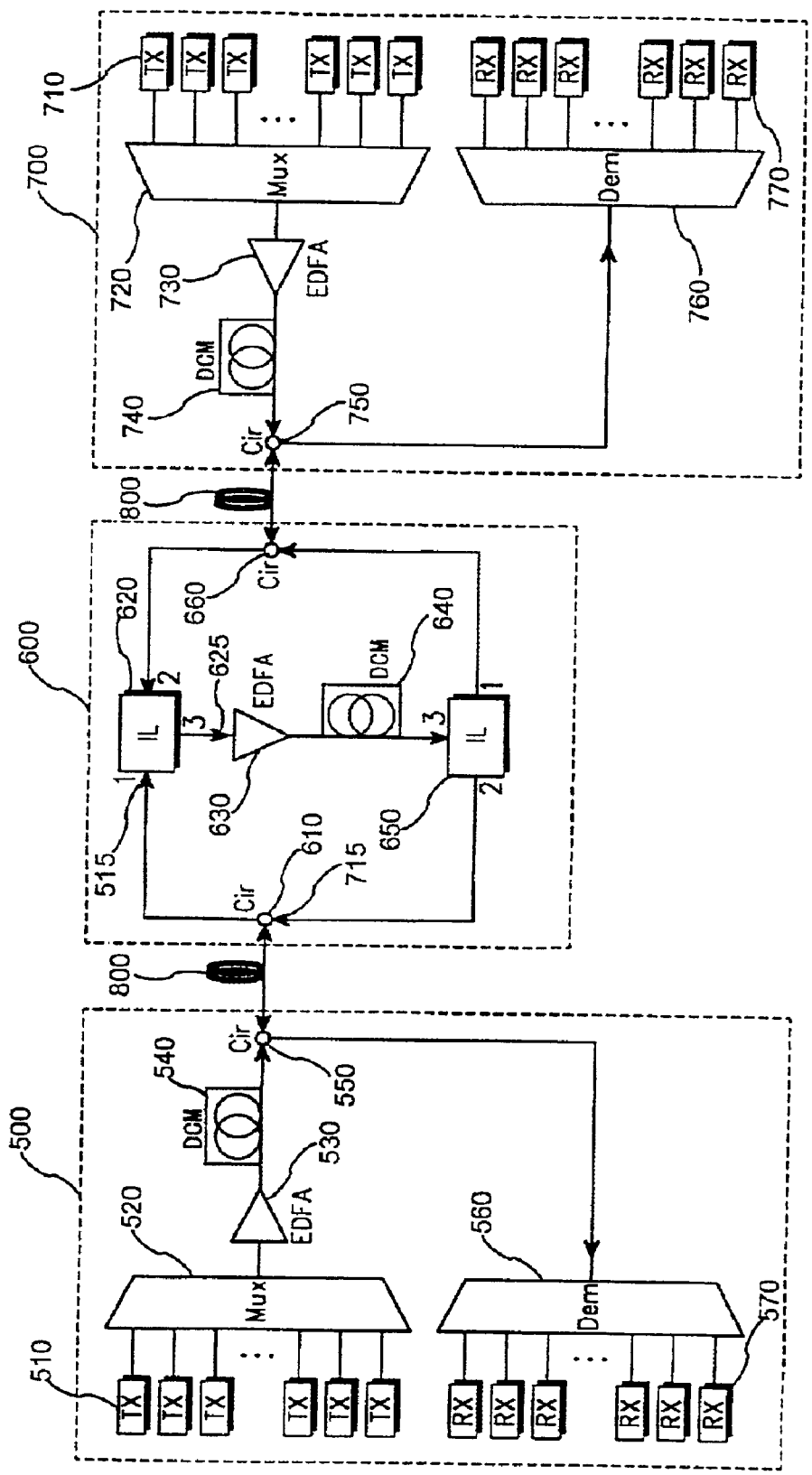
FIG. 4 is a circuit diagram illustrating a bi-directional-wavelength-division multiplexing optical communication system according to a preferred embodiment of the present invention.

FIG. 4 is a circuit diagram illustrating a bi-directional WDM optical communication system according to a preferred embodiment of the present invention. As shown in FIG. 4, the system includes a first optical transmitter/receiver unit 500, an optical amplifier unit 600, a second optical transmitter/receiver unit 700, and an optical fiber 800. The optical signal transmitted from the first optical transmitter/receiver unit 500 to the second optical transmitter/receiver unit 700 is referred to as a forward optical signal 515, whereas the optical signal reversely transmitted is referred to as a reverse optical signal 715. Each of the forward and reverse optical signals 515 and 715 is comprised of a plurality of channels with different wavelengths. That is, the forward optical signal 515 is comprised of a plurality of channels allocated with channels with a desired wavelength space from one another. Also, the reverse optical signal 715 is composed of a plurality of channels allocated with channels with a desired wavelength space from one another.

The first optical transmitter/receiver unit 500 includes a plurality of first transmitters 510, a plurality of first receivers 570, a first wavelength-division multiplexer 520, a first wavelength-division demultiplexer 560, a first amplifier 530, a first dispersion-compensation module 540, and a first optical circulator 550.

In operation, the first transmitters 510 output channels of different wavelengths, respectively. The first wavelength-division multiplexer 520 receives the channels from the first transmitters 510 and multiplexes the received channels to generate a channel-multiplexed signal, that is, the forward optical signal 515. Then, the first amplifier 530 amplifies the forward optical signal 515. The first dispersion-compensation module 540 serves to compensate the dispersion of the forward optical signal 515. That is, the first dispersion-compensation module 540 compensates for the distortion of the forward optical signal 515 caused by the channels of the forward optical signal 515 with different wavelengths, respectively. The first dispersion-compensation module 540 may be a packaged dispersion-compensation fiber or a dispersion-compensation fiber lattice. Thereafter, the first circulator 550 transmits the forward optical signal 515 received from the first dispersion-compensation module 540 to the optical-amplifier unit 600 via the optical fiber 800, while forwarding the reverse optical signal 715 from the optical-amplifier unit 600 to the first wavelength-division demultiplexer 560.

The first wavelength-division demultiplexer 560 demultiplexes the reverse optical signal 715 into a plurality of channels with different wavelengths. The first receivers 570 receive the channels outputted from the first wavelength-division demultiplexer 560. The optical fiber 800 couples the first and second optical transmitter/receiver units 500 and 700 to each other, and serves as a transmission medium for the forward and reverse optical signals 515 and 715.

The optical amplifier unit 600 includes a second circulator 610, a third circulator 660, a first interleaver 620, a second interleaver 650, a second amplifier 630, and a second dispersion compensation module 640. In usage, the second circulator 610 transmits the forward optical signal 515, received from the first optical transmitter/receiver unit 500 via the optical fiber 800, to a first terminal of the first interleaver 620, while sending the reverse optical signal 715, received from a second terminal of the second interleaver 650, to the first optical transmitter/receiver 500 via the optical fiber 800.

The first interleaver 620 interleaves the channels of the forward optical signal 515 received at its first terminal and the channels of the reverse optical signal 715 received at its second terminal, in accordance with the wavelengths of those channels. An interleaved optical signal 625 is outputted from a third terminal of the first interleaver 620. The interleaved optical signal 625 is comprised of the channels of the forward optical signal 515 and the channels of the reverse optical signal 715. The second optical-fiber amplifier 630 amplifies the interleaved optical signal 625 received from the third terminal of the first interleaver 620. The second dispersion-compensation module 640 compensates the dispersion of the amplified optical signal 625 and applies the dispersion-compensated optical signal 625 to a third terminal of the second interleaver 650. The second interleaver 650 splits the optical signal 625, received at its third terminal, into the forward and reverse optical signals 515 and 715 in accordance with wavelengths, and outputs the forward and reverse optical signals 515 and 715 at its first and second terminals. The third circulator 660 distributes the reverse optical signal 715, received thereto via the optical fiber 800, to the second terminal of the first interleaver 620, while transmitting the forward optical signal 515, received from the first terminal of the second interleaver 650, via the optical fiber 800.

The second optical transmitter/receiver unit 700 includes a plurality of second transmitters 710, a plurality of second receivers 770, a second wavelength-division multiplexer 720, a second wavelength-division demultiplexer 760, a third amplifier 730, a third dispersion-compensation fiber 740, and a fourth circulator 750. In operation, the second transmitters 710 output channels of different wavelengths, respectively. These channels will form the reverse optical signal 715. The second wavelength-division multiplexer 720 receives the channels from the second transmitters 710 and multiplexes the received channels, thereby outputting a channel-multiplexed signal, that is, the reverse optical signal 715. The third amplifier 730 serves to amplify the reverse optical signal 715. The third dispersion-compensation module 740 serves to compensate for a dispersion of the reverse optical signal 715. The fourth circulator 750 transmits the reverse optical signal 715 received from the third dispersion-compensation module 740 to the optical amplifier unit 600 via the optical fiber 800, while sending the forward optical signal 515, received from the optical amplifier unit 600 via the optical fiber 800, to the second wavelength-division demultiplexer 760. The second wavelength-division demultiplexer 760 demultiplexes the forward optical signal 515 into a plurality of channels with different wavelengths. The second receivers 770 receive the channels from the second wavelength-division demultiplexer 760.

Figure 5:
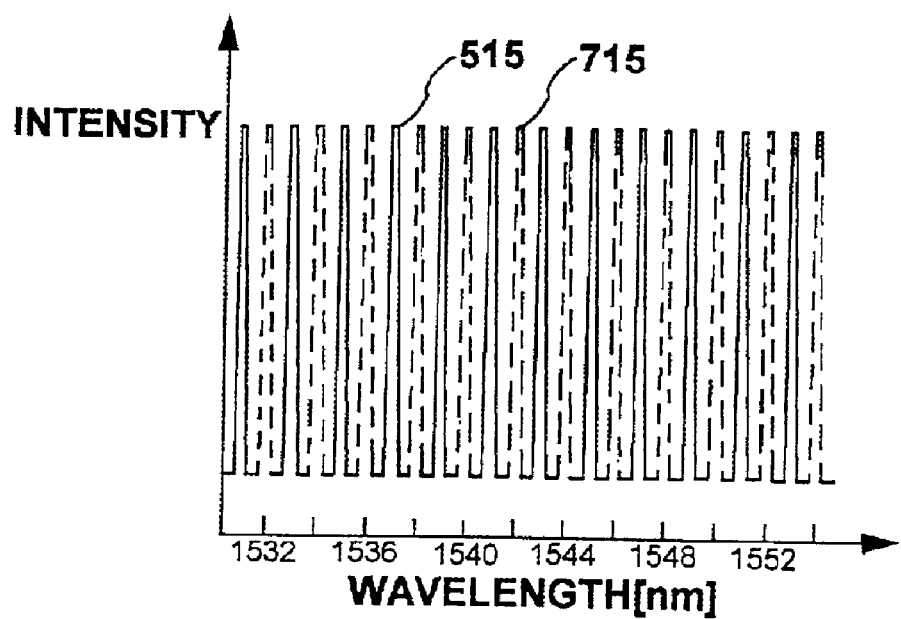
FIG. 5 is a graph depicting forward and reverse optical signals shown in FIG. 4; and, FIG. 6 is a circuit diagram illustrating an optical amplifier unit shown in FIG. 4.

FIG. 5 is a graph depicting the forward and reverse optical signals 515 and 715 of FIG. 4. As shown in FIG. 5, the bi-direcional wavelength-division multiplexing optical communication system of FIG. 4 uses a wavelength band ranging from 1,531 nm to 1,554 nm. Referring to FIG. 5, it can be also seen that the wavelength space between adjacent channels in the forward or reverse optical signal 515 or 715 is 2 nm. The forward optical signal 515 has wavelengths of 1,531 nm, 1,533 nm, 1535 nm, 1,537 nm, 1,539 nm, 1,541 nm, 1,543 nm, 1,545 nm, 1,547 nm, 1,549 nm, 1,551 nm, and 1,553 nm. The reverse optical signal 715 has wavelengths of 1,532 nm, 1,534 nm, 1536 nm, 1,538 nm, 1,540 nm, 1,542 nm, 1,544 nm, 1,546 nm, 1,548 nm, 1,550 nm, 1,552 nm, and 1,554 nm. That is, the forward optical signal 515 is comprised of a plurality of channels allocated with wavelengths with a minimum wavelength space of 2 nm. Also, the reverse optical signal 715 is comprised of a plurality of channels allocated with wavelengths each interleaved between associated ones of the wavelengths of the forward optical signal 515. Accordingly, where the forward and reverse optical signals 515 and 715 are simultaneously traveled through the optical fiber 800 of FIG. 4, a wavelength space of 1 nm is defined between adjacent channels.

Figure 1:
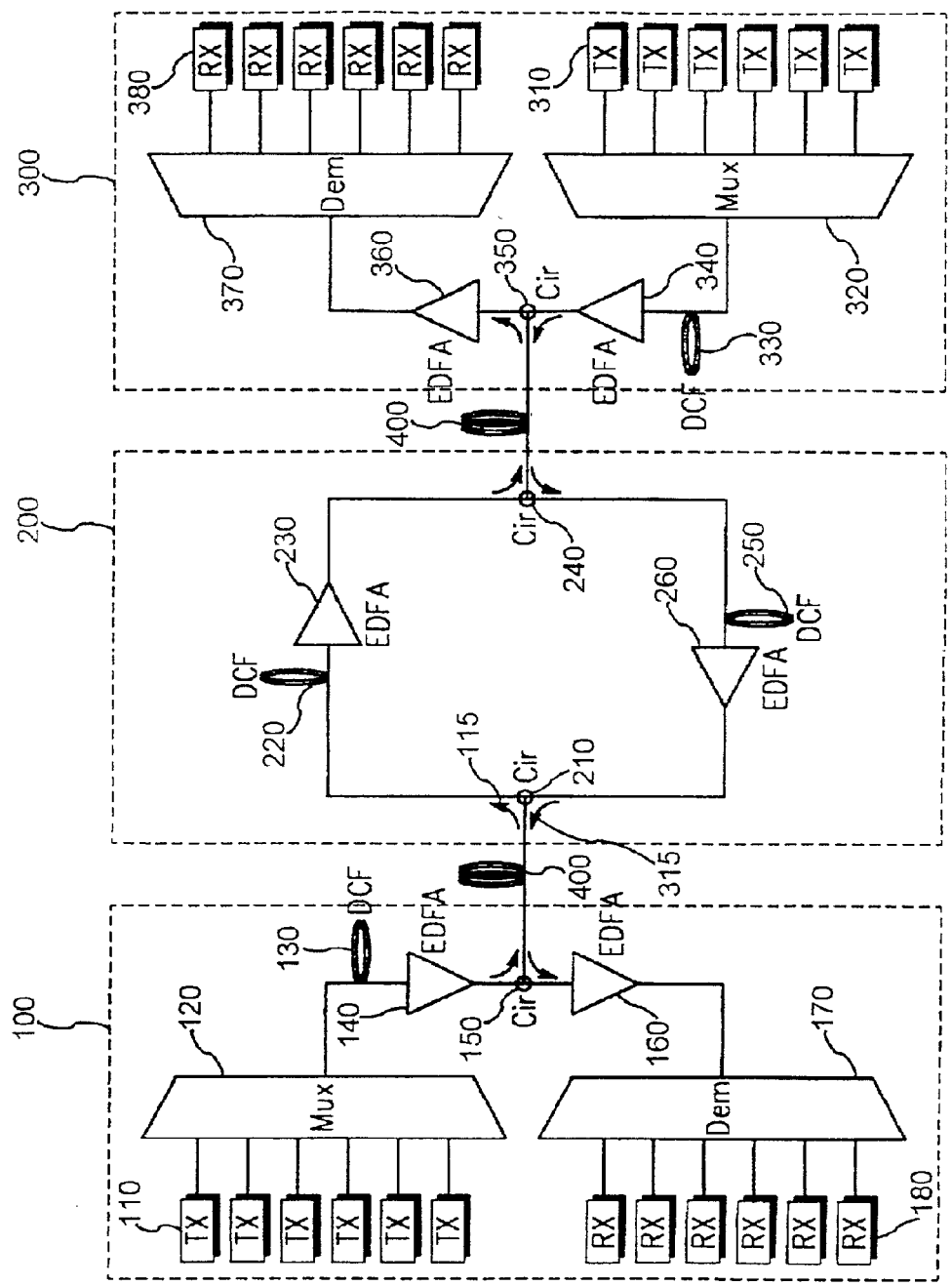
FIG. 1 is a circuit diagram illustrating a conventional bi-directional-wavelength-division multiplexing optical communication system.
Figure 2:
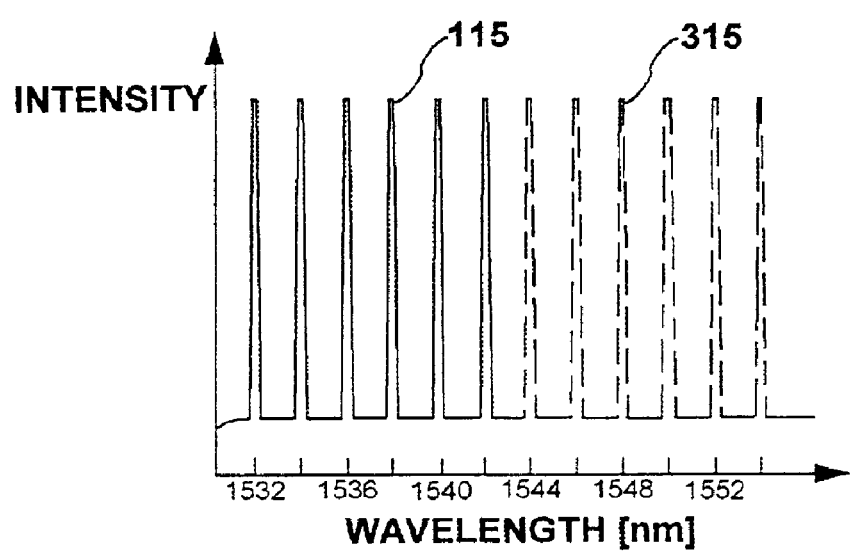
FIG. 2 is a graph depicting forward and reverse optical signals shown in FIG. 1.
Figure 3:
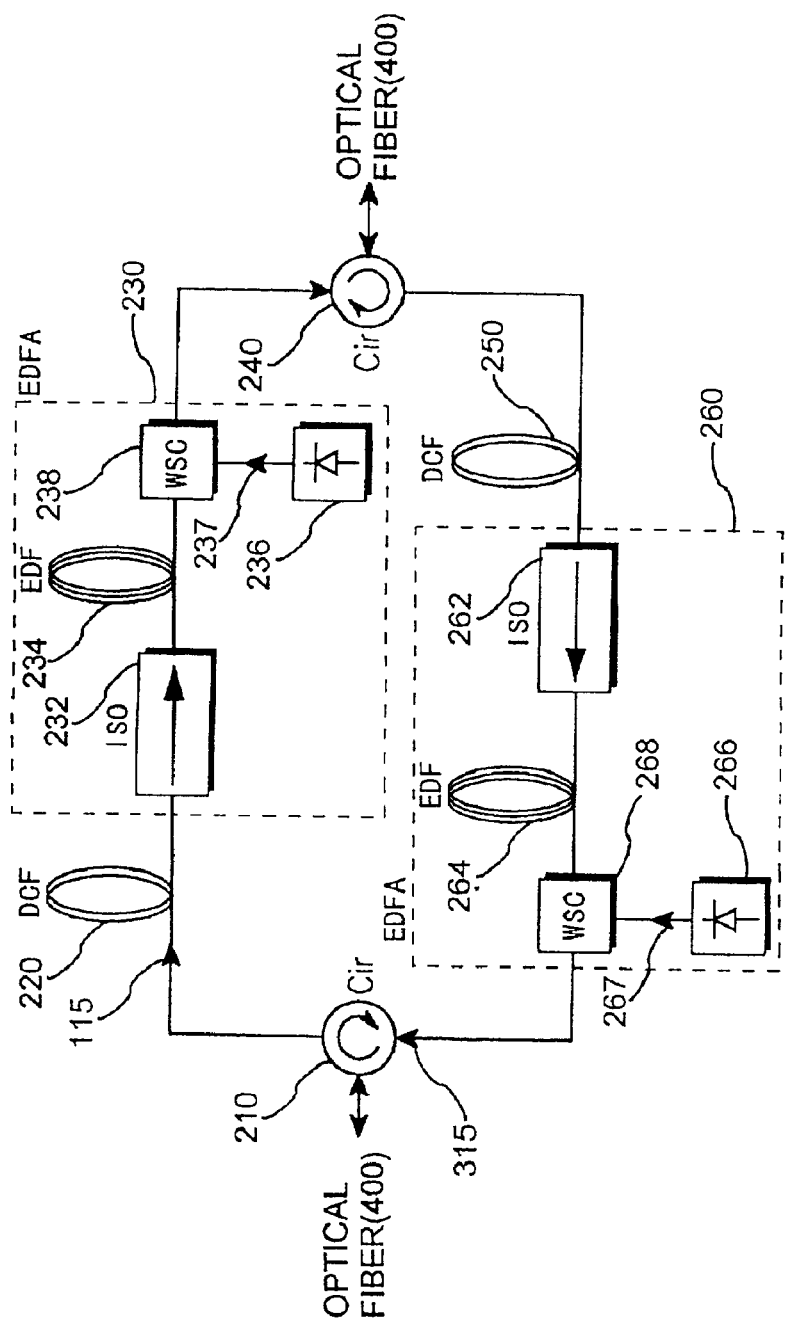
FIG. 3 is a circuit diagram illustrating an optical amplifier unit shown in FIG. 1.

Although the wavelength space of channels is reduced by half in accordance with such an interleaving method, there is no increase in the effect of each channel on adjacent channels because that effect is involved only with channels traveling in the same direction. Accordingly, the maximum number of channels in an optical signal transmittable at the reduced minimum wavelength space is 24. As a result, the system according to the present invention obtains a channel density corresponding to about two times that of the system to shown in FIG. 1, in the same wavelength band.

Figure 6:
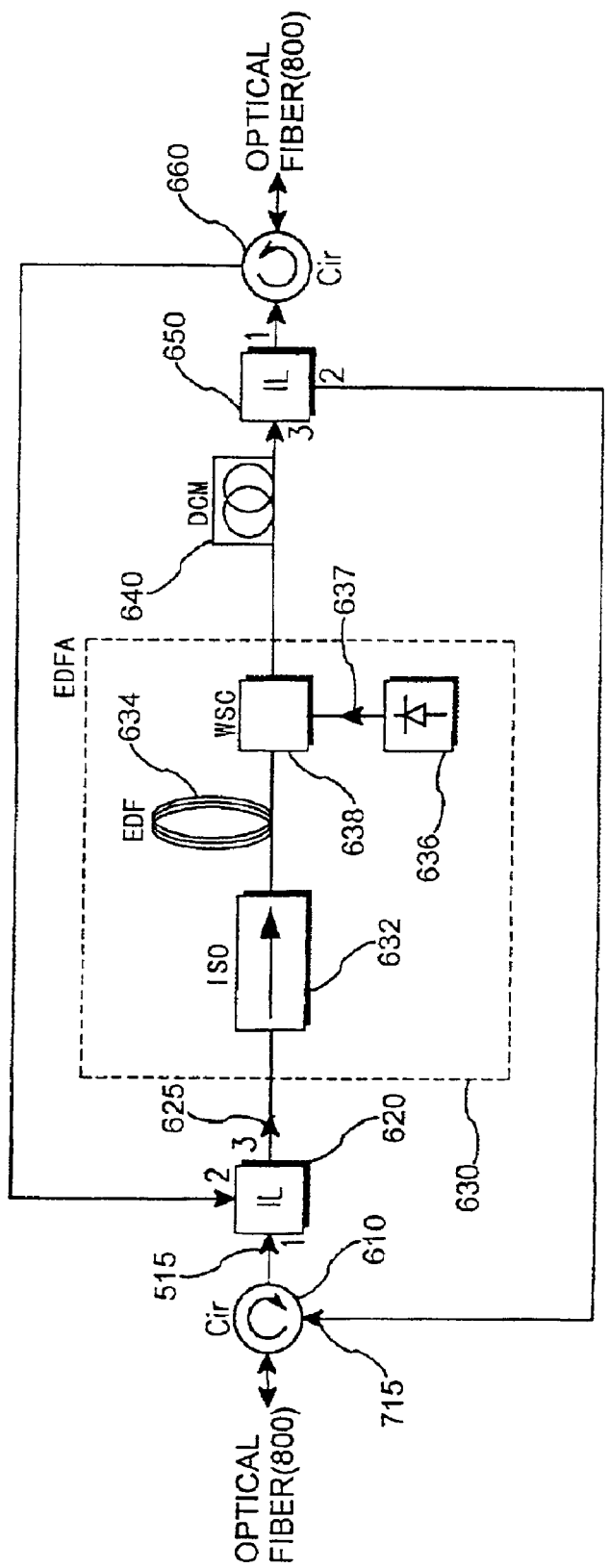

FIG. 6 is a circuit diagram illustrating the optical amplifier unit 600 shown in FIG. 4. As shown in FIG. 6, the optical amplifier unit 600, which includes the second circulator 610, first interleaver 620, second amplifier 630, second dispersion compensation module 640, second interleaver 650, and third circulator 660, further includes an isolator 632, an erbium-doped optical fiber 634, a wavelength selecting coupler 638, and a laser diode 636. The second amplifier 630 has the same configurations as those of the first and third amplifiers 530 and 730. In the following description, the discussion of similar components described in the preceding paragraphs is omitted to avoid redundancy.

The isolator 632 transmits the optical signal 625, received from the third terminal of the first interleaver 620, therethrough while preventing optical signals, traveling in a reverse direction from the optical signal 625, from passing therethrough. The optical signal 625 is comprised of the channels of the forward optical signal 515 and the channels of the reverse optical signal 715. Accordingly, the pumping light 637 traveling along the erbium-doped optical fiber 634 after being outputted from the laser diode 636, cannot pass through the isolator 632. The erbium-doped optical fiber 634 amplifies the optical signal 625 by utilizing an induced emission of excited erbium ions. The erbium-doped optical fiber 634 may be substituted by a praseodymium (Pr)-doped optical fiber. The Pr-doped optical fiber serves to amplify an input optical signal by utilizing an induced emission of Pr ions.

The pumping light 637, which is required to excite erbium ions, is emitted from the laser diode 636. The wavelength-selecting coupler 638 transmits the amplified optical signal 625 therethrough, so that the amplified optical signal 625 is applied to the third terminal of the second interleaver 650. The wavelength-selecting coupler 638 also sends the pumping light 637, received from the laser diode 636, to the erbium-doped optical fiber 634.

As apparent from the above description, the optical amplifier device of the present invention is configured to interleave the channels of a forward optical signal and the channels of a reverse optical signal and to amplify the interleaved channels. In accordance with this configuration, it is possible to reduce the number of duplicated elements, as compared to conventional configurations. Accordingly, the optical amplifier device of the present invention provides advantages in that it can be inexpensively manufactured while achieving a high integration degree.

Also, the bi-directional wavelength-division-multiplexing optical communication system of the present invention can transmit a forward optical signal composed of a plurality of channels respectively allocated with wavelengths having a desired wavelength space and a reverse optical signal composed of a plurality of channels respectively allocated with wavelengths each interleaved between associated ones of the wavelengths of the forward optical signal. Accordingly, there is an advantage in that the channel density in a maximum wavelength band can be maximized.

While this invention has been described in connection with what is presently considered to be the most practical and preferred embodiment, it is to be understood that the invention is not limited to the disclosed embodiment; on the contrary, it is intended to cover various modifications within the spirit and scope of the appended claims.

What is claimed:

1. In a bi-directional wavelength division multiplexing optical communication system of the type having first and second optical transmitter/receiver units for transmitting and receiving wavelength-division-multiplexed optical signals, respectively, and an optical fiber serving as a transmission medium for a forward optical signal traveling from the first optical transmitter/receiver unit to the second optical transmitter/receiver unit and a reverse optical signal traveling from the second optical transmitter/receiver unit to the first optical transmitter/receiver unit, each of the forward and reverse optical signals being composed of a plurality of channels with different wavelengths, and an optical amplifier device for amplifying the forward and reverse optical signals, comprising:

a first interleaver for interleaving the channels of the forward optical signal received at a first terminal thereof and the channels of the reverse optical signal received at a second terminal thereof, in accordance with the wavelengths of the channels, and outputting an interleaved optical signal at a third terminal thereof;

an optical fiber amplifier unit comprising a single amplifier for amplifying only the interleaved optical signal received from the third terminal of the first interleaver and outputting the amplified optical signal; and, a second interleaver for splitting the amplified optical signal, received at a third terminal thereof, into the forward and reverse optical signals in accordance with wavelengths and outputting the forward and reverse optical signals at first and second terminals thereof, respectively.

2. The optical amplifier device according to claim 1, further comprising:

a first circulator for transmitting the forward optical signal, received thereto via the optical fiber, to the first terminal of the first interleaver while transmitting the reverse optical signal, received from the second terminal of the second interleaver, to the optical fiber; and, a second circulator for transmitting the reverse optical signal, received thereto via the optical fiber, to the second terminal of the first interleaver while transmitting the forward optical signal, received from the first terminal of the second interleaver, to the optical fiber.

3. The optical amplifier device according to claim 1, further comprising:

a dispersion-compensation module coupled between the third terminal of the first interleaver and the third terminal of the second interleaver and adapted to compensate for a dispersion of the interleaved optical signal.

4. The optical amplifier device according to claim 2, further comprising:

a dispersion-compensation module coupled between the third terminal of the first interleaver and the third terminal of the second interleaver and adapted to compensate for a dispersion of the interleaved optical signal.

5. A bi-directional wavelength-division multiplexing optical communication system comprising:

a first optical transmitter/receiver unit for transmitting a forward optical signal composed of a plurality of channels respectively allocated with wavelengths having a desired wavelength space while receiving a reverse optical signal composed of a plurality of channels respectively allocated with wavelengths each interleaved between associated ones of the wavelengths of the forward optical signal;

a second optical transmitter/receiver unit for transmitting the reverse optical signal while receiving the forward optical signal;

an optical fiber coupled between the first and second optical transmitter/receiver units, the optical fiber serving as a transmission medium for the forward and reverse optical signals; and, an optical amplifier device comprising a single amplifier arranged on the optical fiber and adapted to interleave the channels of the forward and reverse optical signals, bi-directionally received via the optical fiber, in accordance with the wavelengths of the channels, to amplify only a single interleaved optical signal generated in accordance with the interleaving operation, to split the amplified optical signal into the forward and reverse optical signals in accordance with wavelengths, and to bi-directionally transmit the split forward and reverse optical signals via the optical fiber.

6. The system according to claim 5, wherein the optical-amplifier device comprises:

a first interleaver for interleaving the channels of the forward optical signal received at a first terminal thereof and the channels of the reverse optical signal received at a second terminal thereof, in accordance with the wavelengths of the channels to generate the interleaved optical signal, and outputting an interleaved optical signal at a third terminal thereof;

an optical fiber amplifier unit for amplifying the interleaved optical signal received from the third terminal of the first interleaver, and outputting the amplified optical signal; and, a second interleaver for splitting the amplified optical signal, received at a third terminal thereof, into the forward and reverse optical signals in accordance with wavelengths, and outputting the forward and reverse optical signals at first and second terminals thereof, respectively;

a first circulator for transmitting the forward optical signal, received thereto via the optical fiber, to the first terminal of the first interleaver while transmitting the reverse optical signal, received from the first terminal of the second interleaver, to the optical fiber; and, a second circulator for transmitting the reverse optical signal, received thereto via the optical fiber, to the second terminal of the first interleaver while transmitting the reverse optical signal, received from the second terminal of the second interleaver, to the optical fiber.

7. The system according to claim 6, wherein the optical amplifier device further comprises:

a dispersion compensation module coupled between the third terminal of the first interleaver and the third terminal of the second interleaver and adapted to compensate for a dispersion of the interleaved optical signal.

* * * * *